United States Patent [19]
Tateishi

[11] Patent Number: 5,889,336
[45] Date of Patent: Mar. 30, 1999

[54] POWER GENERATING INSTALLATION

[76] Inventor: Kazuo Tateishi, 89, Seto-higashimachi 2-chome, Kochi, Japan

[21] Appl. No.: 924,111

[22] Filed: Sep. 5, 1997

[51] Int. Cl.$^6$ .................................................. F03B 13/12
[52] U.S. Cl. .............................. 290/53; 290/43; 60/506
[58] Field of Search .................. 290/42, 53; 60/506, 60/507; 417/330

[56] References Cited

U.S. PATENT DOCUMENTS

| | | |
|---|---|---|
| 987,685 | 3/1911 | Atkinson . |
| 3,567,953 | 3/1971 | Lord ............................ 290/42 |
| 4,145,885 | 3/1979 | Solell .......................... 60/504 |
| 4,242,593 | 12/1980 | Quilico et al. ................ 290/53 |
| 4,434,375 | 2/1984 | Taylor .......................... 290/53 |
| 4,720,976 | 1/1988 | Kim et al. ..................... 60/53 |
| 4,851,704 | 7/1989 | Rubi ............................. 290/53 |
| 5,066,867 | 11/1991 | Shim ............................ 290/53 |
| 5,359,229 | 10/1994 | Youngblood ................. 290/53 |
| 5,424,582 | 6/1995 | Trepl, II et al. .............. 290/53 |

Primary Examiner—Nestor Ramirez
Assistant Examiner—Nicholas Ponomarenko
Attorney, Agent, or Firm—Frishauf, Holtz, Goodman, Langer & Chick

[57] ABSTRACT

A power generating installation located in a shallow water area of the sea for generating power utilizing a shallow water wave comprises a mooring member located either in the sea or at the sea bottom, a chain having one end connected with the mooring member and the other end to which a deadweight is attached, and a float provided with a generator and a rotary member for rotating engaged with the chain. Rotary force of the rotary member produced when the float moves up and down according to an up-and-down motion of the wave is transmitted to the generator, thereby to generate power.

6 Claims, 13 Drawing Sheets

POWER GENERATING INSTALLATION

BACKGROUND OF THE INVENTION

1. Field of the Invention

The present invention relates to a power generating installation utilizing wave force which generates electrical power utilizing an up-and-down motion of a shallow water wave to rotate a generator.

2. Description of Related Art

Many examples are known in the art of generating electrical power utilizing an up-and-down motion of a shallow water wave. As an example which is related to the present invention, there is known a wave activated buoy which moves up and down along a guide tower. A power generating installation of this sort is, for the sake of classification, called a movable body type, and is capable of high energy absorption.

However, a power generating installation utilizing an up-and-down motion of a wave is generally large in scale, so that it is liable to incur a high generating cost.

Further, it has a drawback that it is difficult provide the installation with sufficient strength for resisting heavy weather, for example, due to passing of a depression, or a marine anomaly such as tsunami.

SUMMARY OF THE INVENTION

The present invention is made considering the above described state of art. A first object of the present invention is to provide a power generating installation utilizing wave force which is compact enough to enable mass production, and which is capable of efficiently absorbing kinetic energy of an up-and-down motion of a wave and transforming that energy to electrical power.

A second object of the present invention is to provide a power generating installation utilizing wave force which is capable of bringing down a float below the sea surface at the time of heavy weather, for example, due to passing of a depression, and at the time of a marine anomaly such as tsunami, thereby preventing the power generating installation from being damaged by abnormal external force produced at the sea surface.

According to the present invention, the above described problems are solved in the following manner:

(1) In a power generating installation located in a shallow water area of the sea for generating power utilizing a shallow water wave, a force transmitting member is connected at its one end with a mooring member located either in the sea or at the sea bottom, and a dead-weight is attached to the other end of the force transmitting member. A float having a generator and a rotary member is provided, and the rotary member is engaged with the force transmitting member.

Rotary force of the rotary member produced when the float moves up and down according to an up-and-down motion of a wave is transmitted to the generator, thereby to generate power.

(2) In the power generating installation described in the above paragraph (1), the rotary member and the generator are connected through a reversible unit having its input and output shafts so arranged that the output shaft rotates constantly in the same direction regardless of the direction of rotation of the input shaft, so that the generator rotates in the same direction both when the wave is rising and when the wave is falling in its up-and-down motion.

(3) In the power generating installation described in the above paragraph (2), the reversible unit includes a gear mechanism for transmitting rotary force of a generator to the rotary member, and at the time of heavy weather, for example, due to passing of a depression, and at the time of marine anomaly such as tsunami, the generator is made to function as an electric motor and rotates the rotary member through the gear mechanism, thereby to bring down the float below the sea surface.

(4) A plurality of the power generating installation described in the above paragraphs (1), (2) or (3) are located in a sea area having a depth of 25~80 m and connected with each other by connecting members in the manner that each of the floats is capable of moving up and down.

In the power generation installation having the features described in the above paragraph (1), it is possible to efficiently generate powerutilizing wave force with relatively compact structure. Since such a power generation installation does not require a large-scale installation in the sea, a generating cost can be reduced.

In the power generation installation having the features described in the above paragraph (2), it is possible to rotate the generator constantly in the same direction both when the wave is rising and when the wave is falling in its up-and-downmotion. Thus, power can be generated with high efficiency.

In the power generating installation having the features described in the above paragraph (3), it is possible to bring down the float below the sea surface to a depth where the float is not liable to be influenced by a violent wave motion at the sea surface, at the time of heavy weather, for example, due to passing of a depression, and at the time of a marine anomaly such as tsunami. Thus, the damage of the power generating installation can be prevented. The float is brought down having the generator function as an electric motor. Thus, an additional power source is not required for this operation, so that the power generating installation can be made compact. In addition, the float can be brought down with relatively easy operation.

In the power generating installation having the features described in the above paragraph (4), it is possible to prevent the floats from interfering with each other due to horizontal pressing force of a wave. Thus, power can be derived from natural energy, efficiently.

The above described and further objects, features and advantages of the present invention will become clearer from a detailed description which will be hereunder given based on the attached drawings.

DETAILED DESCRIPTION OF THE PREFERRED EMBODIMENTS

Embodiments of the present invention will be hereunder described based on the drawings.

FIGS. 1A to 1C and 2 are schematic diagrams relating to an embodiment of a power generating installation utilizing wave force according to the present invention, in which it is supposed that the power generating installation is located in a sea area having a depth of, for example, 35 m.

The power generating installation comprises a float 1 which is moored in a sea area not so far from the coast, a dead weight 2 suspended in the sea, and a short link chain 4 for connecting the dead weight 2 and a tetrapod 3 located at the sea bottom. In order to prevent electrolytic corrosion in the sea, plates of metal having a large ionization tendency, for example, zinc plates are attached to metal portions of the power generating installation.

In the present embodiment, the tetrapod 3 is used as a mooring member. However, a mooring member is not limited to the tetrapod 3. Any means which is able to moor the power generating installation in a desired shallow water area may be used in place of the tetrapod 3. For example, a concrete block, an anchor and a variety of heavy things to which an end of the short link chain 4 used as a force transmitting member can be fixed, for example, a waste railroad rail can be used as a mooring member. Further, the mooring member does not need to be located at the sea bottom. It may be a floating body which floats midway between the sea surface and the sea bottom.

The force transmitting member, which is provided for driving a generator 11 (described later) to rotate by an up-and-down motion of the float 1, is not limited to the short link chain 4. Any means which is durable in this working environment, i.e., in the ocean, and has a sufficient strength may be used in place of the short link chain 4. A variety of things, for example, a roller chain, a wire rope, a timing belt and so forth are usable.

Figure 5:
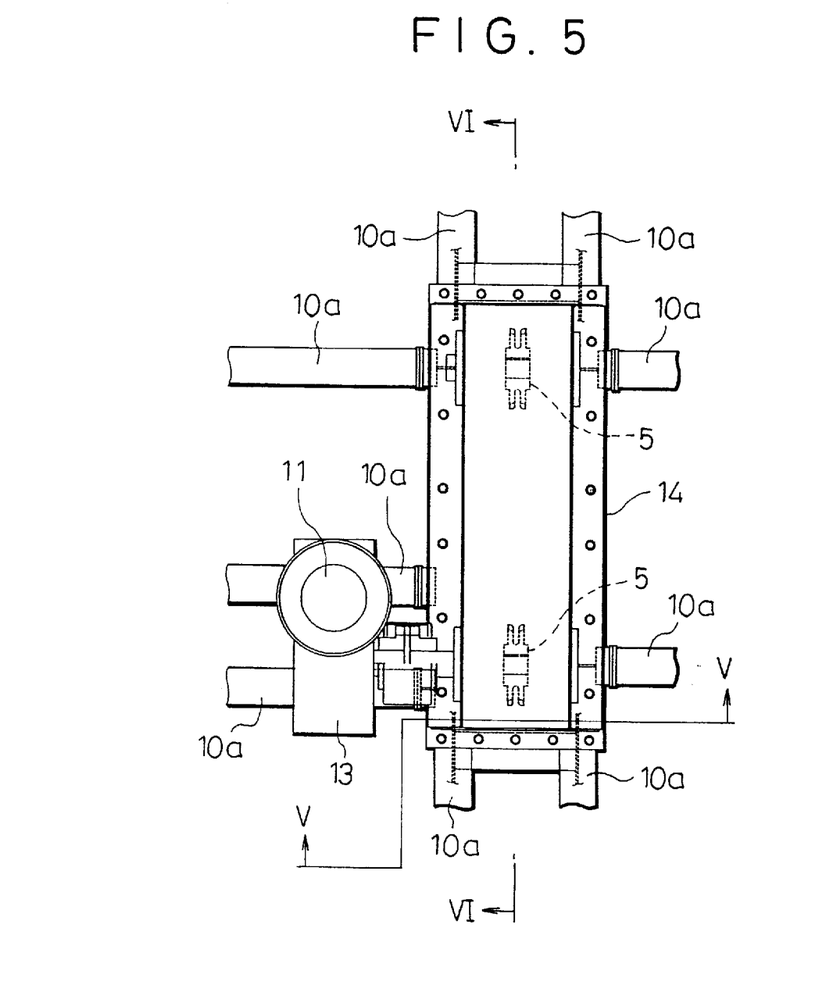
FIG. 5 is a plan view of a mechanical part as seen from the top thereof.
Figure 6A:
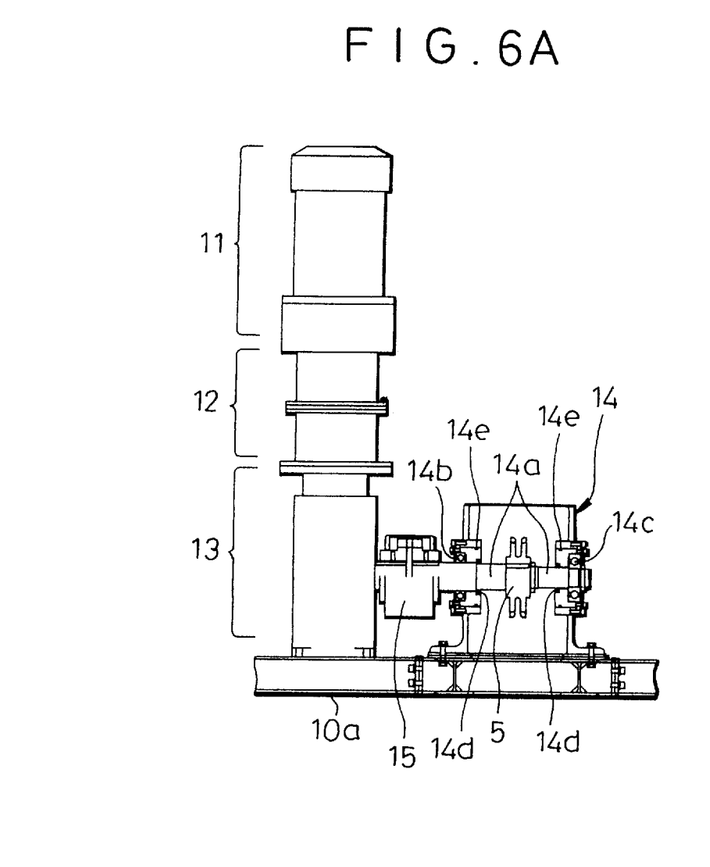
FIG. 6A is a cross section of the mechanical part shown in FIG. 5 taken along V—V line.
Figure 6B:
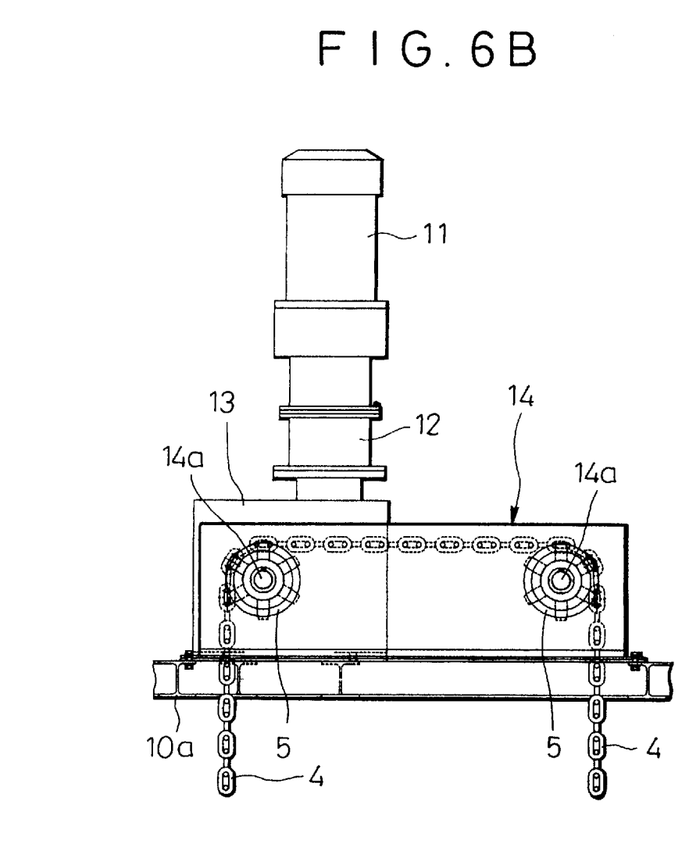
FIG. 6B is a cross section of the mechanical part shown in FIG. 5 taken along VI—VI line.

Generally, waves are classified depending on whether a depth of a sea area where they are produced is more than 80 m or not. Waves produced at a sea area having a depth of more than 80 m are called deep waves, and waves produced at a sea area having a depth of less than 80 m are called shallow water waves. The shallow water wave has a tendency to increase in wave-height as it approaches the coast. The present power generating installation obtains kinetic energy of an up-and-down motion of the shallow water wave in the form of kinetic energy of a rotary motion of a sprocket wheel 5 which rotates accompanying an up-and-down motion of the float 1, thereby to drive a generator 11 (as shown in FIGS. 5, 6A, 6B etc.) provided inside the float 1 to rotate and generate electrical power.

Figure 14:
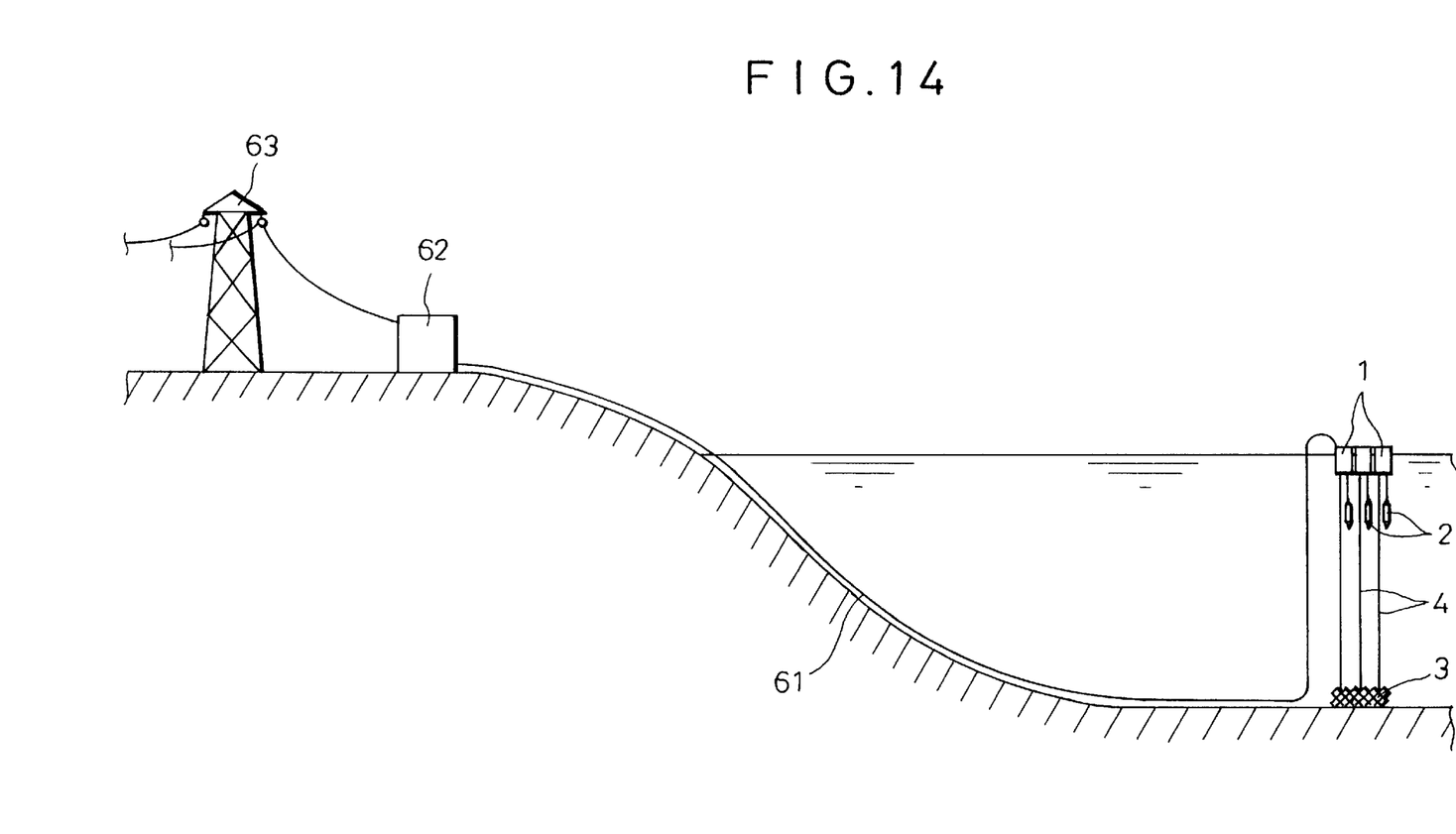
FIG. 14 is a schematic view showing formation of a power feeding and receiving system comprising a power generating installation according to the present invention and a land-based installation.

As shown in FIG. 14, electrical power generated in this manner is transmitted through a submarine cable 61 and through a building 62 built on the coast to a pylon 63. When the float 1 is to be brought down below the sea surface, electrical power is fed to the generator 11 reversely though this route. The building 62 accommodates electric installations for performing a variety of operations required for that transmission and feeding of electrical power.

Figure 1A:
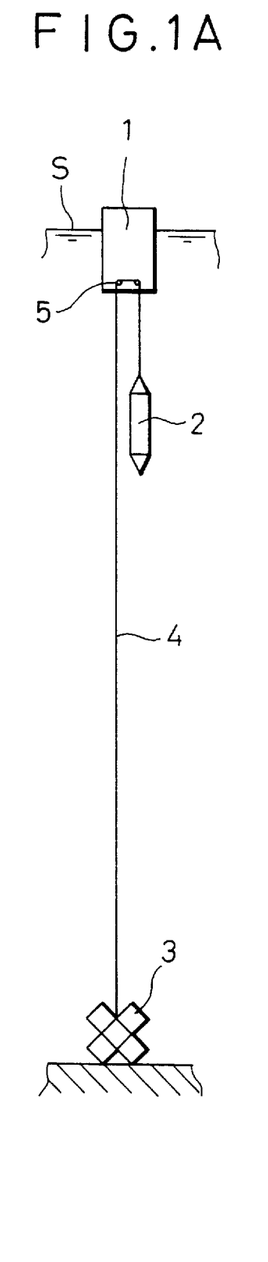
FIGS. 1A to 1C are schematic diagrams for showing relation between fluctuation of the sea level and a position of a float of a power generating installation according to the present invention.
Figure 1B:
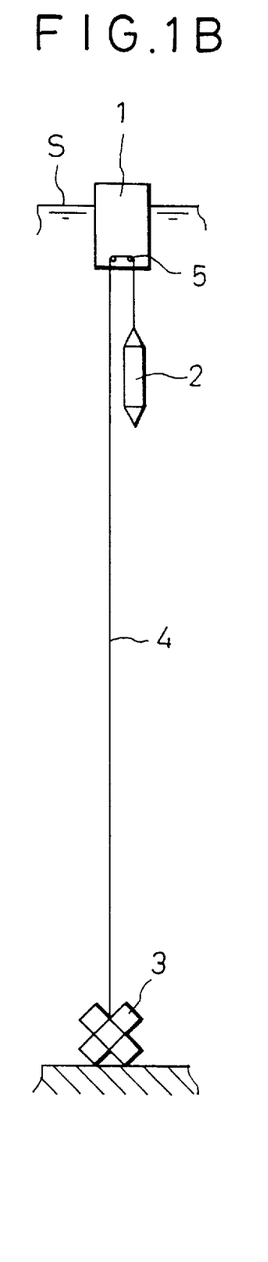
Figure 1C:
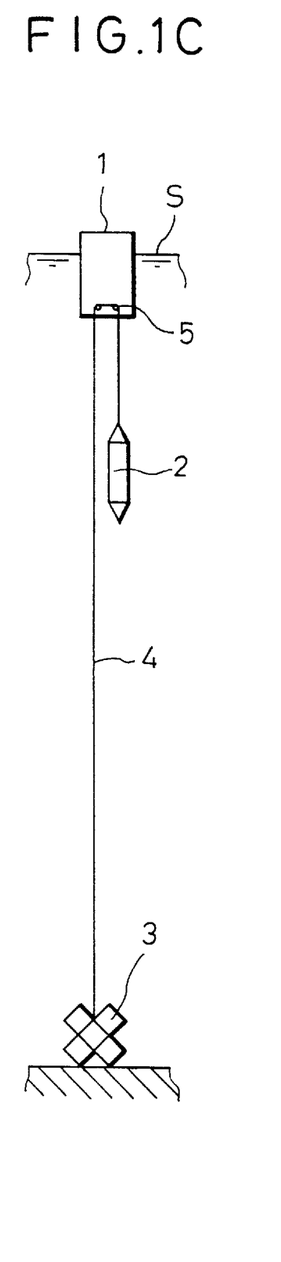
Figure 2:
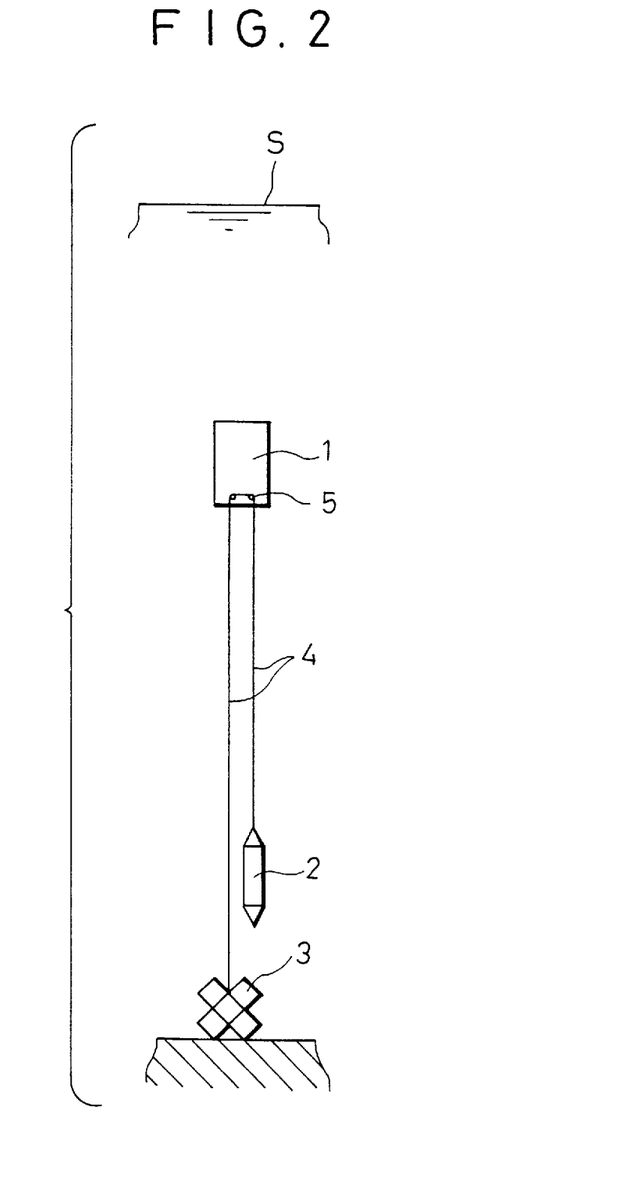
FIG. 2 is a schematic diagram for showing a position of a float of a power generating installation according to the present invention taken at the time of heavy weather, for example, due to passing of a depression and at the time of marine anomaly.

FIG. 1A shows a position of the float 1 of the present power generating installation when the sea surface S is at a reference level, FIG. 1B shows the float 1 lifted to the top of a wave when the sea surface S rises 1 m from the reference level, and FIG. 1C shows the float 1 pulled down to the bottom of a wave when the sea surface S falls 1 m from the reference level. FIG. 2 shows the power generating installation having its float 1 brought down below the sea surface. At the time of heavy weather, for example, due to passing of a depression, or at the time of marine anomaly such as tsunami, electrical power is externally fed to the generator provided inside the float 1, thereby to make the generator function as an electric motor. The float 1 is brought down below the sea surface by driving force from the generator, thereby to avoid a surge.

The dead weight 2 is provided for the following purposes:

(1) to rotate the sprocket wheels 5 when the float 1 descends down from the top to the bottom of a wave and vice versa.

(2) to give tension to the short link chain 4 so that the sprocket wheels 5 and the short link chain 4 may smoothly engage with each other.

(3) to prevent the float 1 from being pushed toward the coast by horizontal pressing force of a wave, and to make the float 1 capable of being restored laterally to its position by such tension as pulling the float 1 back to approximately above the tetrapod 3.

In the present embodiment, the dead weight 2 is approximately 4200 mm in length, 800×800 mm in cross section as perpendicular to its longitudinal direction, and made of concrete so as to produce a load of 4 tons in the sea.

Next, formation of the float 1 will be described.

Figure 3A:
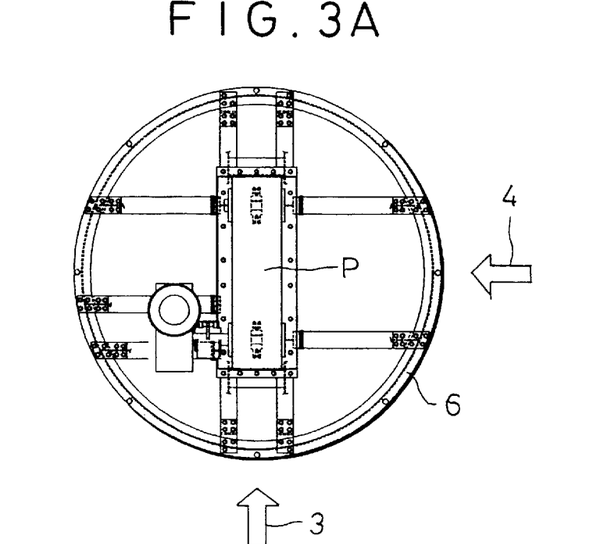
FIG. 3A is a plan view showing an arrangement of a mechanical part of a float as seen from the top thereof removing an iron plate covering the surrounding thereof.
Figure 3B:
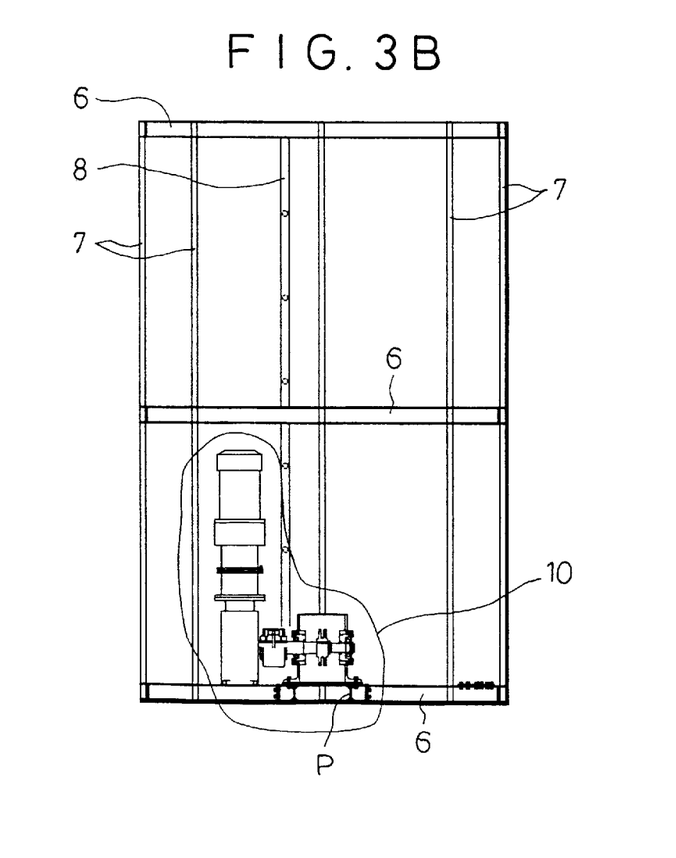
FIG. 3B is a front view of the float shown in FIG. 3A as seen in the direction indicated by an arrow 3 in FIG. 3A.

FIGS. 3A, 3B, 4A and 4B show formation of the float 1. FIG. 3A is a plan view showing an arrangement of a mechanical part of the float 1 as seen from the top thereof, FIG. 3B a front view of the float 1 as seen in the direction indicated by an arrow 3 in FIG. 3A, FIG. 4A a plan view of the float 1 as seen from the top thereof, FIG. 4B a side view of the float 1 as seen in the direction indicated by an arrow 4 in FIG. 3A. Actually, the float 1 has its outside face covered with iron plates, except for its bottom central rectangular portion P where sprocket wheels 5 are provided. FIGS. 3A, 3B, 4A and 4C show internal structure of the float 1 removing those iron plates.

The size of the float 1 may be chosen appropriately according to the scale of the power generating installation and so forth. In the present embodiment, the whole float 1 has a cylindrical shape of 2200 mm in diameter and 3450 mm in height, and the iron plates covering its outside face are 1.2 mm or so in thickness.

The float 1 comprises a welded construction. Frames 6 are H sections of 100 mm×100 mm bent by a bender into a ring shape. Three of those frames 6 are arranged at the upside, middle and bottom, and connected through eight pipes 7 which are vertically arranged and welded to those three frames 6 with spit-like formation, thereby to form the welded construction of the float 1.

A mechanical part 10 of the power generating installation is arranged at the bottom of the float 1, and a manhole 9 (shown in FIG. 4A) is provided at the upside center of the float 1 for the maintenance of the mechanical part 10. The manhole 9 is closed with a manhole cover (not shown) when the power generating installation is in operation. A gasket (not shown) is provided to prevent the sea water from penetrating to the inside.

Figure 4A:
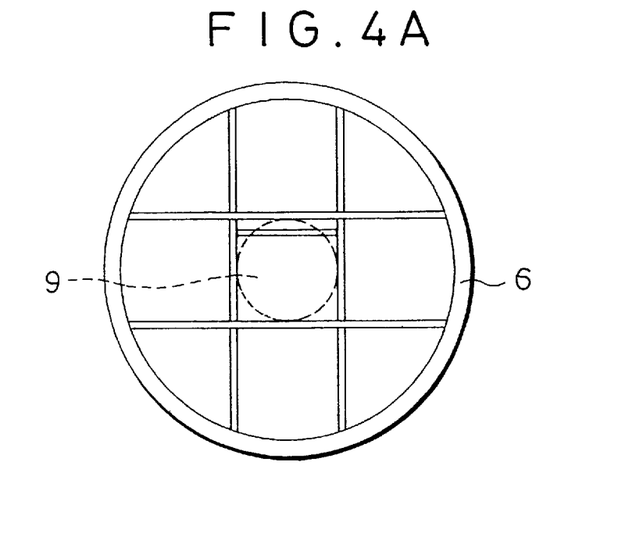
FIG. 4A is a plan view of the float as seen from the top thereof removing an iron plate covering the surrounding thereof.

Below the manhole 9, a ladder 8 is provided for the maintenance.

Figure 4B:
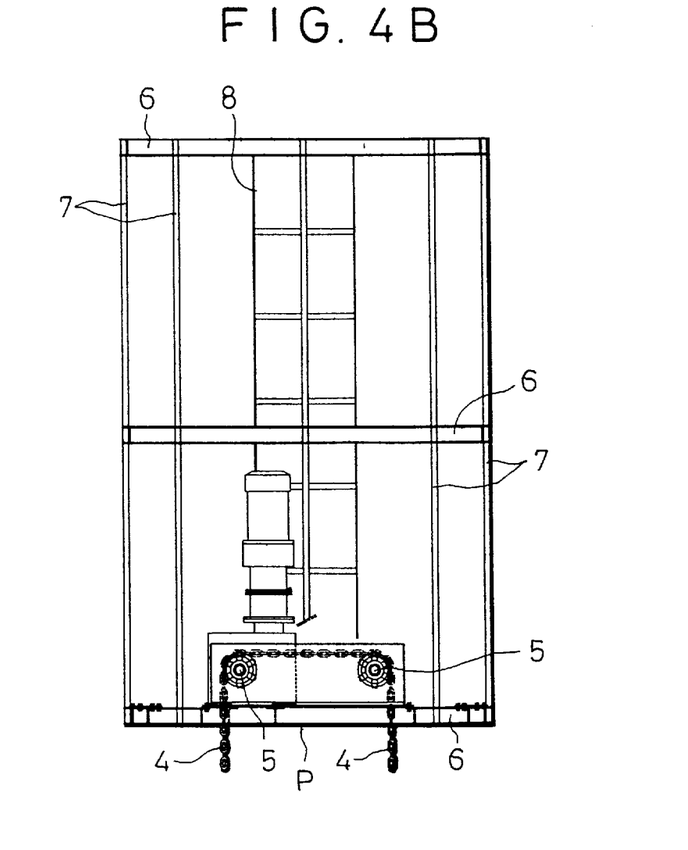
FIG. 4B is a side view of the float shown in FIG. 3A as seen in the direction indicated by an arrow 4 in FIG. 3A.

As mentioned above, the whole welded structure of the float 1 is covered with iron plates having a thickness of 1.2 mm or so except for its bottom central rectangular portion P, thereby to form the float 1. As shown in 4B, the sprocket wheels 5 are provided at the inside bottom central portion of the float 1, and the short link chain 4 is engaged with the sprocket wheels 5. In order that the short link chain 4 can vary its position engaged with the float 1 vertically according to the up-and-down motion of a wave, the bottom central rectangular portion P opens downward.

Next, the mechanical part 10 will be described.

FIGS. 5, 6A and 6B show formation of the mechanical part 10. FIG. 5 is a plan view of the mechanical part 10 as seen from the top thereof, FIG. 6A a cross section of the mechanical part 10 taken along V—V line in FIG. 5, and FIG. 6B a cross section of the mechanical part 10 taken along VI—VI line in FIG. 5.

The mechanical part 10 comprises a sprocket unit 14, a generator 11, a reversible unit 12, speed-up gears 13 and a coupling 15, which are fixed on support members 10a which are fixed to the frame 6.

The sprocket unit 14 is a welded construction formed of shape steel, round bars and plates, and has a box-like shape. As shown in FIGS. 6A and 6B, a shaft 14a is mounted horizontally at the middle portion of the sprocket unit 14. The shaft 14a is supported by bearings 14b and 14c at its both ends, and carries each one sprocket wheel 5. Thus, the sprocket unit 14 has two sprocket wheels 5. A seal 14d and an O-ring 14e is provided in the vicinity of each of the bearings 14b and 14c so as to prevent the sea water from penetrating to the inside. In addition, a gasket (not shown) is laid under the lower end portion of the sprocket unit 14 also in order to prevent the sea water from penetrating to the inside.

Kinetic energy of an up-and-down motion of a wave turns to rotary power of the sprocket wheels 5, which is transmitted through the coupling 15 to the speed-up gears 13, increased in speed by the speed-up gears 13, and conducted to the reversible unit 12. The reversible unit 12 is so provided that the direction of rotation outputted to the generator 11 is constant even when the direction of rotation inputted to the reversible unit 12 is reversed.

Next, formation of the reversible unit 12 will be described.

Figure 7A:
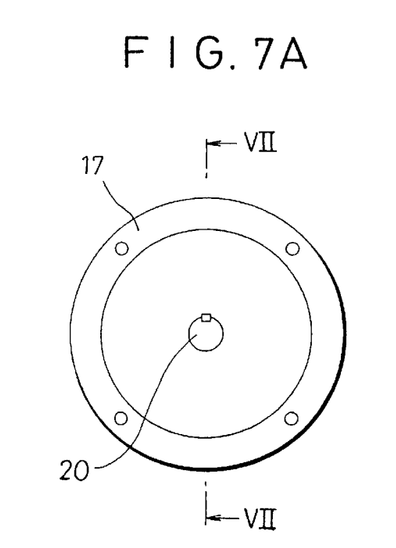
FIG. 7A is a side view of a reversible unit as seen from the side of an input side shaft.

FIGS. 7A to 7C and FIGS. 8A to 8C show formation of the reversible unit 12. FIG. 7A is a side view of the reversible unit 12 as seen from the side of an input side shaft 20, FIG. 7B a cross section taken along VII—VII line in FIG. 7A, FIG. 7C a side view of the reversible unit 12 as seen from the side of an output side shaft 21, FIG. 8A a cross section taken along VIII—VIII line in FIG. 7B, FIG. 8B a cross section taken along IX—IX line in FIG. 7B, FIG. 8C a cross section taken along X—X line in FIG. 8A, FIG. 8D a development developed along XI—XI line in FIG. 8A.

The reversible unit 12 is surrounded by three members, i.e., an input side housing 17, a center housing 18 and an output side housing 19. Inside those housings are contained two types of spur gears of module 4 based on JIS B1701 (ISO 53, 54), that is, seven spur gears of one type 30 to 32 and 36 to 39 and three spur gears of the other type 33 to 35. Besides those spur gears, two one-way clutches 40, 41 and an electromagnetic clutch 42 are also contained. Each of those members is supported with a shaft, radial bearings and needle bearings.

Figure 7B:
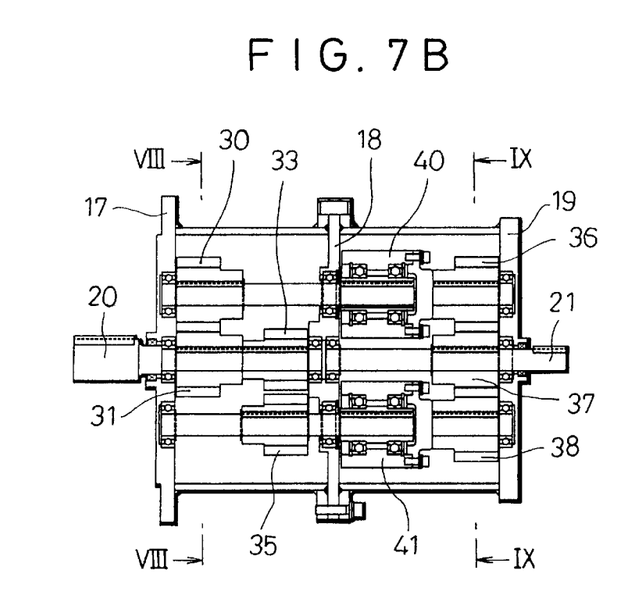
FIG. 7B is a cross section taken along VII—VII line in FIG. 7A.
Figure 7C:
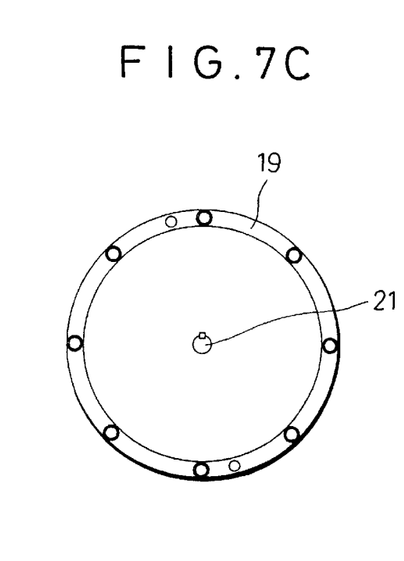
FIG. 7C is a side view of the reversible unit as seen from the side of an output side shaft.
Figure 8A:
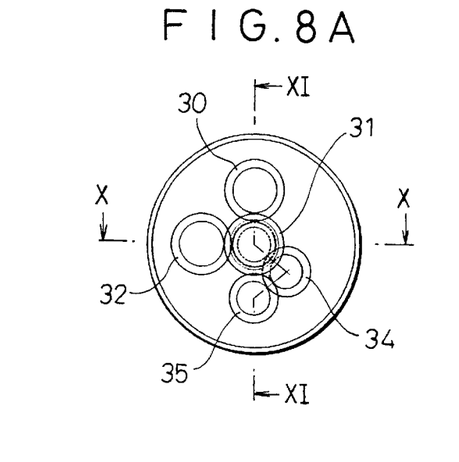
FIG. 8A is a cross section taken along VIII—VIII line in FIG. 7B.
Figure 8B:
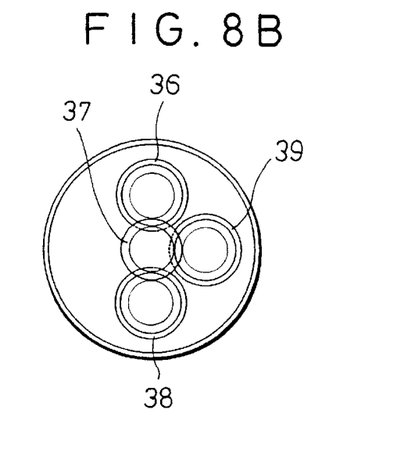
FIG. 8B is a cross section taken along IX—IX line in FIG. 7B.
Figure 8C:
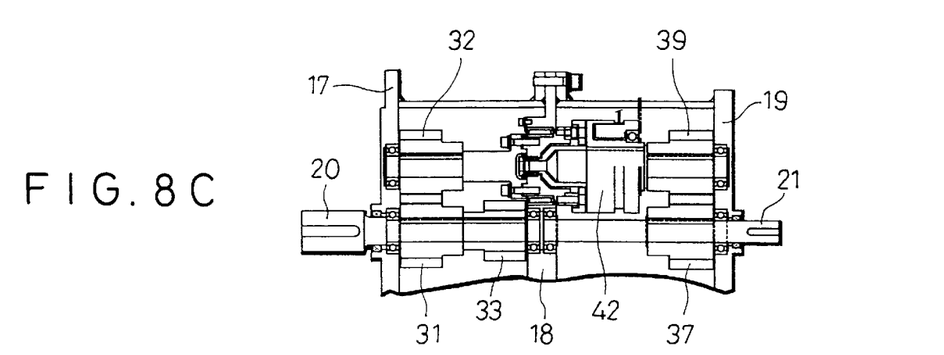
FIG. 8C is a cross section taken along X—X line in FIG. 8A.
Figure 8D:
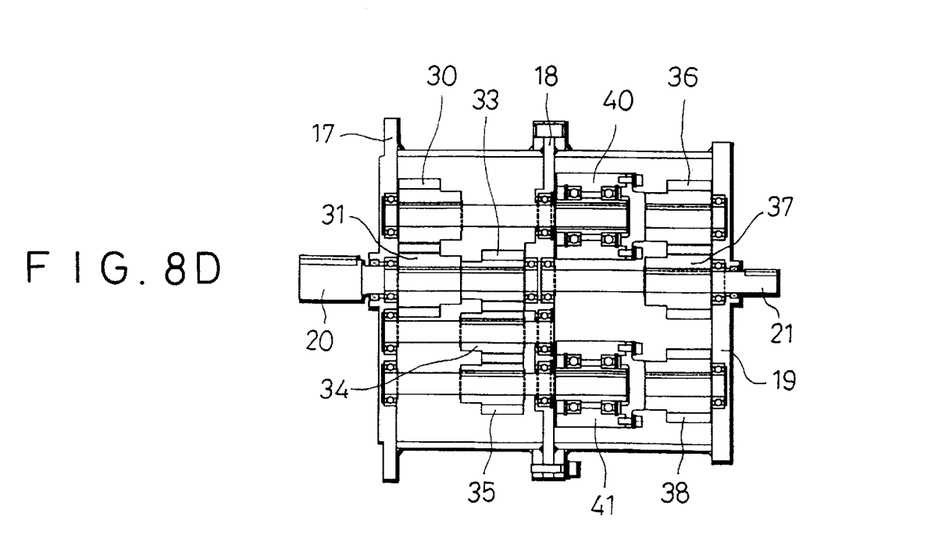
FIG. 8D is a development developed along XI—XI line in FIG. 8A.

Oil seals are provided at root portions of the input side shaft 20 and the output side shaft 21 in order to prevent leakage of internal lubricant oil.

Next, operation of the reversible unit 12 will be described.

Figure 9A:
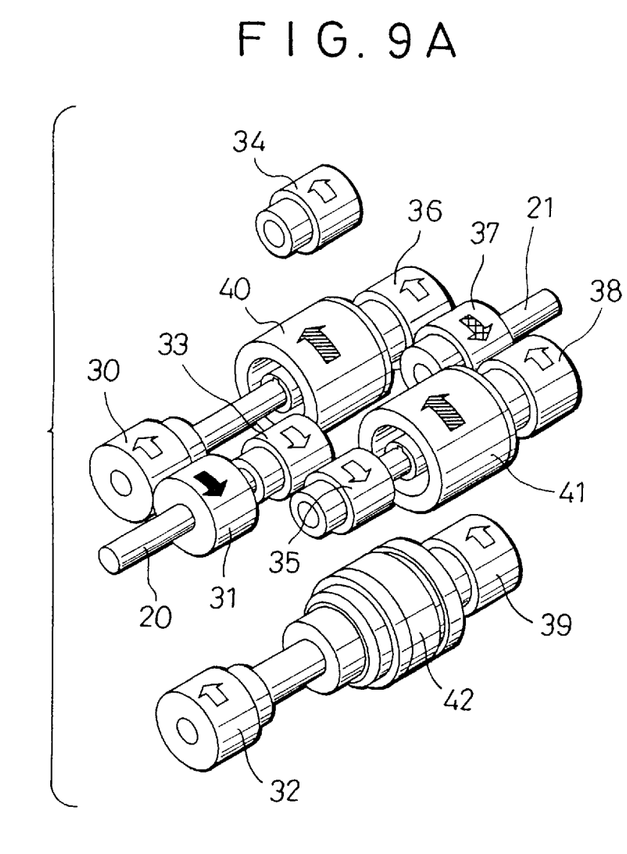
FIG. 9A is an explanatory diagram for explaining operation of the reversible unit in the case where a clockwise input is given.
Figure 9B:
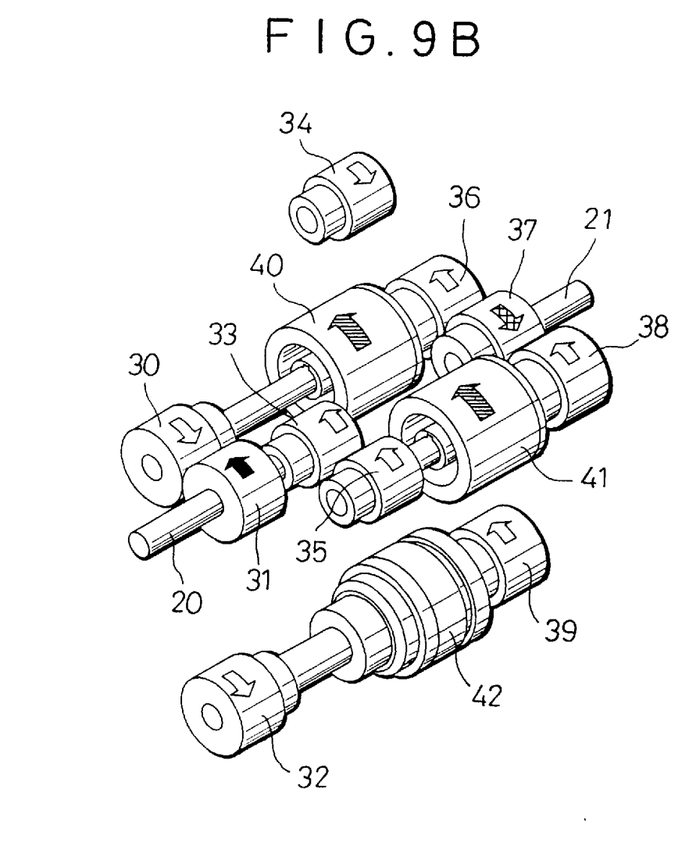
FIG. 9B is an explanatory diagram for explaining operation of the reversible unit in the case where a counterclockwise input is given.
Figure 10:
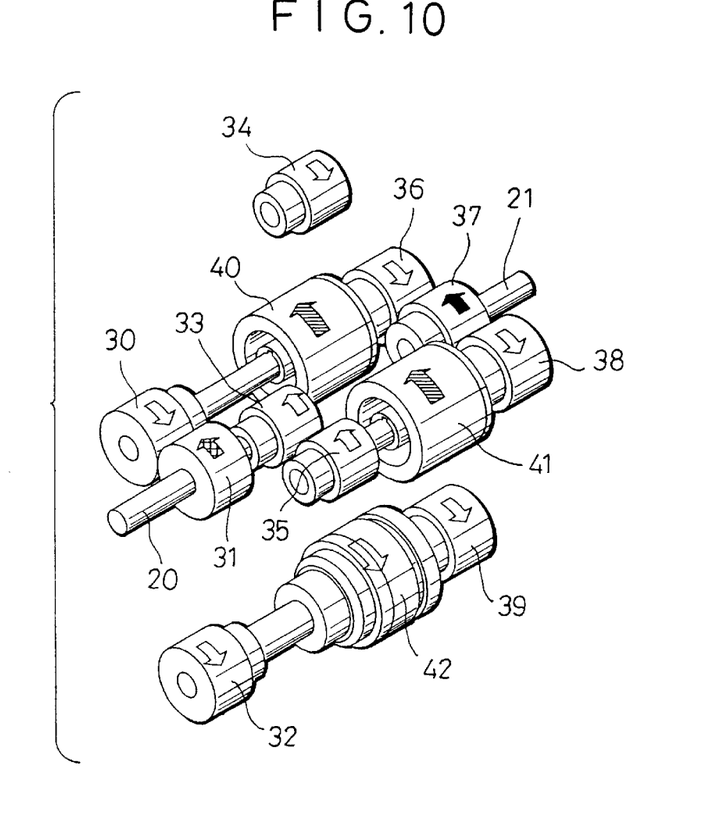
FIG. 10 is an explanatory diagram for explaining operation of the reversible unit in the case where a generator is made to function as an electric motor.

FIGS. 9A, 9B and 10 are explanatory diagrams for explaining operation of the reversible unit 12. FIG. 9A shows the operation in the case where a clockwise input is given, FIG. 9B in the case where a counterclockwise input is given, and FIG. 10 in the case where the generator 11 is made to function as an electric motor.

For convenience of explanation, the spur gear 34 and a set of the spur gear 32, the electromagnetic clutch 42 and the spur gear 39 are shown in those Figures as if they were vertically distant from the other members. Actually, as shown in FIGS. 7A to 8D, the spur gear 34 engages with the spur gear 33 and the spur gear 35, the spur gear 32 engages with the spur gear 31, and the spur gear 39 is located right under the spur gear 37 and engages therewith.

The operation will be described based on the following condition: The one-way clutches 40, 41 have their outer rings connected with the spur gears 36, 38, respectively. Each of the one-way clutches 40, 41 is so provided that only when the direction of rotation of the shaft with which the inner ring engages agrees with the direction of rotation of the outer ring, clutch claws come into engagement, thereby to transmit the rotation of the shaft to the outer ring, or to transmit the rotation of the outer ring to the shaft and the inner ring. It is supposed that arrows with oblique hatching which are attached along the outer rings of the one-way clutches 40, 41 in FIGS. 9A, 9B and 10 indicate the engagement directions of the respective one-way clutches 40, 41.

It is supposed that FIG. 9A showing a clockwise input corresponds to a state of the float 1 at the time when a wave is rising, and FIG. 9B showing a counterclockwise input corresponds to a state of the float 1 at the time when a wave is falling.

(1) In the case where a clockwise input is given (FIG. 9A)

When a clockwise input is given to the input side shaft 20, the spur gear 31 rotates clockwise. The spur gear 33, which is connected with the spur gear 31 through a key, rotates clockwise, the spur gear 34 rotates counterclockwise, and the spur gear 35 rotates clockwise. At that time, since the engagement direction of the one-way clutch 41 is opposite to the direction of rotation of spur gear 35, the one-way clutch 41 rotates idly.

The spur gear 30 rotates counterclockwise. Since the direction of rotation of the spur gear 30 agrees with the engagement direction of the one-way clutch 40, the one-way clutch 40 comes into engagement, so that the torque of the spur gear 30 is transmitted to the spur gear 36, and the spur gear 37 rotates clockwise.

At the time of this normal operation, an electric current is not applied to the electromagnetic clutch 42, so that the electromagnetic clutch 42 is out of engagement. Thus, the spur gears 32, 38, and 39 rotate counterclockwise idly.

(2) In the case where a counterclockwise input is given (FIG. 9B)

When a counterclockwise input is given to the input side shaft 20, the spur gear 31 rotates counterclockwise and the spur gear 30 rotates clockwise. At that time, since the engagement direction of the one-way clutch 40 is opposite to the direction of rotation of the spur gear 30, the one-way clutch 40 rotates idly.

The spur gear 33 rotates counterclockwise, the spur gear 34 rotates clockwise, and the spur gear 35 rotates counterclockwise. Since the direction of rotation of the spur gear 35 agrees with the engagement direction of the one-way clutch 41, the one-way clutch 41 comes into engagement, so that the torque of the spur gear 35 is transmitted to the spur gear 38, and the spur gear 37 rotates clockwise.

The same description as given in the above (1) is applicable to the operation of the electromagnetic clutch 42. The spur gear 32 rotates clockwise idly, and the spur gears 36 and 39 rotate counterclockwise idly.

In this way, the generator 11 contained in the float 1 is continuously supplied with torque in the same direction both at the time when a wave are rising and at the time when a wave is falling, thereby to generate electrical power.

(3) In the case where an input is given from the generator side (FIG. 10)

The generator 11 is originally a three-phase induction motor. Therefore, an input electric current is supplied from the land side to the generator 11 as shown in FIG. 14, so that an input is given to the spur gear 37 from the generator side. When the spur gear 37 rotates counterclockwise, the spur gears 36 and 38 rotate clockwise. At that time, since the engagement directions of the one-way clutches 40, 41 are both counterclockwise, neither of the one-way clutches 40, 41 comes into engagement. Thus, the torque from the generator 11 is not transmitted to the spur gears 30, 31, 33, 34 and 35 through the routes passing though the one-way clutches 40 and 41.

The spur gear 39 rotates clockwise. At that time, if an electric current is applied to the electromagnetic clutch 42, the spur gears 32 and 39 at both sides become mechanically connected with each other, so that the spur gear 32 rotates clockwise, and the spur gear 31 rotates counterclockwise. The spur gears 30 and 34 rotate clockwise idly, and the spur gears 33 and 35 rotate counterclockwise idly.

The torque from the spur gear 31 is inputted to the speed-up gears 13. As the speed-up gears 13, those which are originally used as reduction gears are utilized in the reverse manner. The rotating speed of the motor is reduced by the speed-up gears 13 according to its reduction ratio, while the torque is increased as much. The increased torque is transmitted to the coupling 15 and the sprocket wheel 5, thereby to wind up the short link chain 4. At that time, since the short link chain 4 has its one end moored to the tetrapod 3 located at the sea bottom, the float 1 is brought down below the sea surface.

When the float 1 arrives at the depth of 10~15 m, an electric current to the generator 11 is cut, and an electric current is applied to an electric brake (not shown) provided at the rear end of the generator 11. The electric brake operates to cramp the motor shaft only when an electric current is applied thereto. When an electric current is not applied thereto, the electric brake is directed mechanically by a spring in such a direction as not cramping the motor shaft.

By the operation of the electric brake, the float 1 is brought into a stationary state.

Next, operation at the time when the float 1 is returned to the sea surface will be described.

In FIG. 10, clockwise torque, that is, torque in the direction opposite to that indicated in FIG. 10, is given by buoyancy of the float 1 to the input side spur gear 31. By releasing the electric brake and the electromagnetic clutch 42, torque in the same direction as in the case of FIG. 9A where an input has a clockwise direction is given to the spur gear 31. Thus, the generator 11 is rotated by external buoyancy. As a result, the float 1 lifts gradually, and return to the sea surface in a while. When the float returns to the sea surface, the power generating installation starts its normal operation.

It is to be noted that supposing the engagement directions of the one-way clutches 40 and 41 were both opposite to those indicated in Figures, the mechanism described in respect of (1) the case where a clockwise input is given and (2) the case where a counterclockwise input is given is still effective, but the mechanism described in respect of (3) the case where an input is given from the generator side does not operate.

Next, a power generating installation group having a plurality of floats of the above described power generating installation arranged on the sea.

Figure 11A:
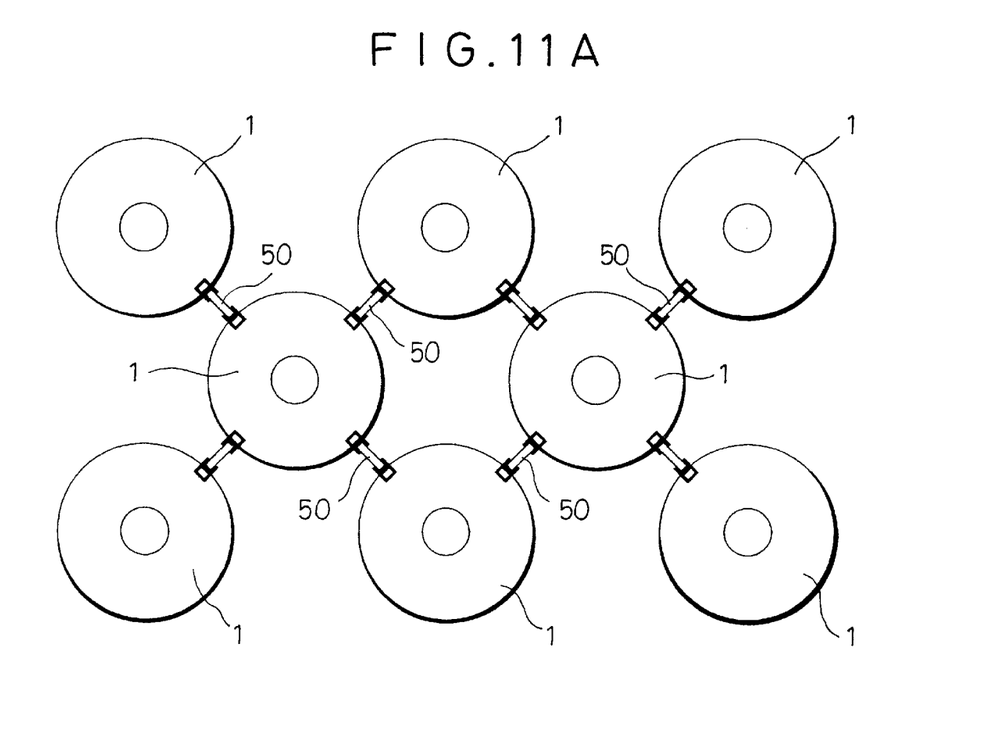
FIG. 11A is a schematic plan view of a power generating installation group having a plurality of floats connected by connecting members.
Figure 11B:
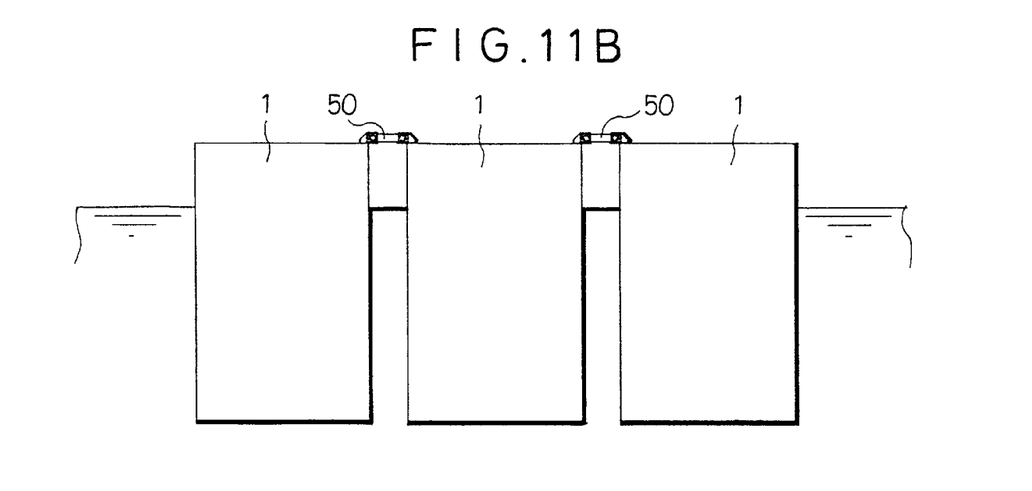
FIG. 11B is a schematic front view of the power generating installation group.

FIGS. 11A and 11B are schematic views of a power generating installation group.

As shown in those Figures, the floats 1 are connected with each other by connecting members 50 at their peripheral portions.

Figure 12A:
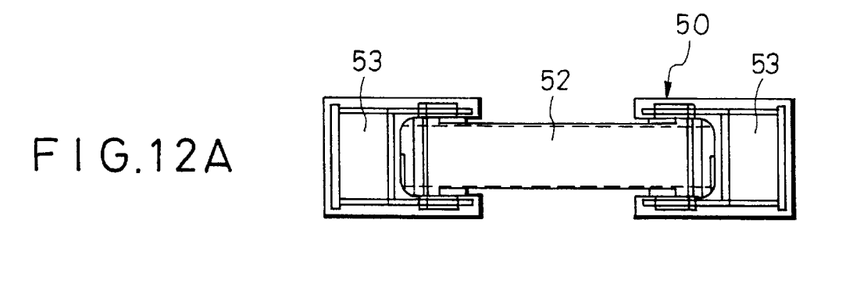
FIG. 12A is a plan view showing formation of a connecting member.
Figure 12B:
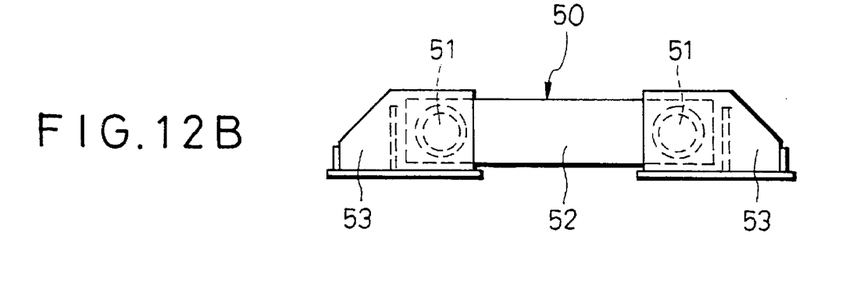
FIG. 12B is a front view showing formation of the connecting member.

As shown in FIGS. 12A and 12B, the connecting member 50 has such formation that a link 52 is supported by shafts 51 which are fitted to pass through respective brackets 53 on both sides. The link 52 can turn around the shaft 51. Therefore, the floats 1 connected by connecting members 50 are not fixed to each other, but are allowed to move relative to each other vertically and horizontally to a certain extent which does not hinder absorption of energy of an up-and-down motion of a wave.

The power generating installation group-of which a plurality of the floats 1 are connected by the connecting members 50 as shown in FIGS. 11A and 11B can prevent the floats 1 from interfering with each other due to the pressing force and/or the up-and-down motion of the wave.

Next, the power generated by the present power generating installation will be described.

The description will be made of an example based on the following conditions.

Machine elements used in the present example are those described in respect of the foregoing Figures.

Figure 13:
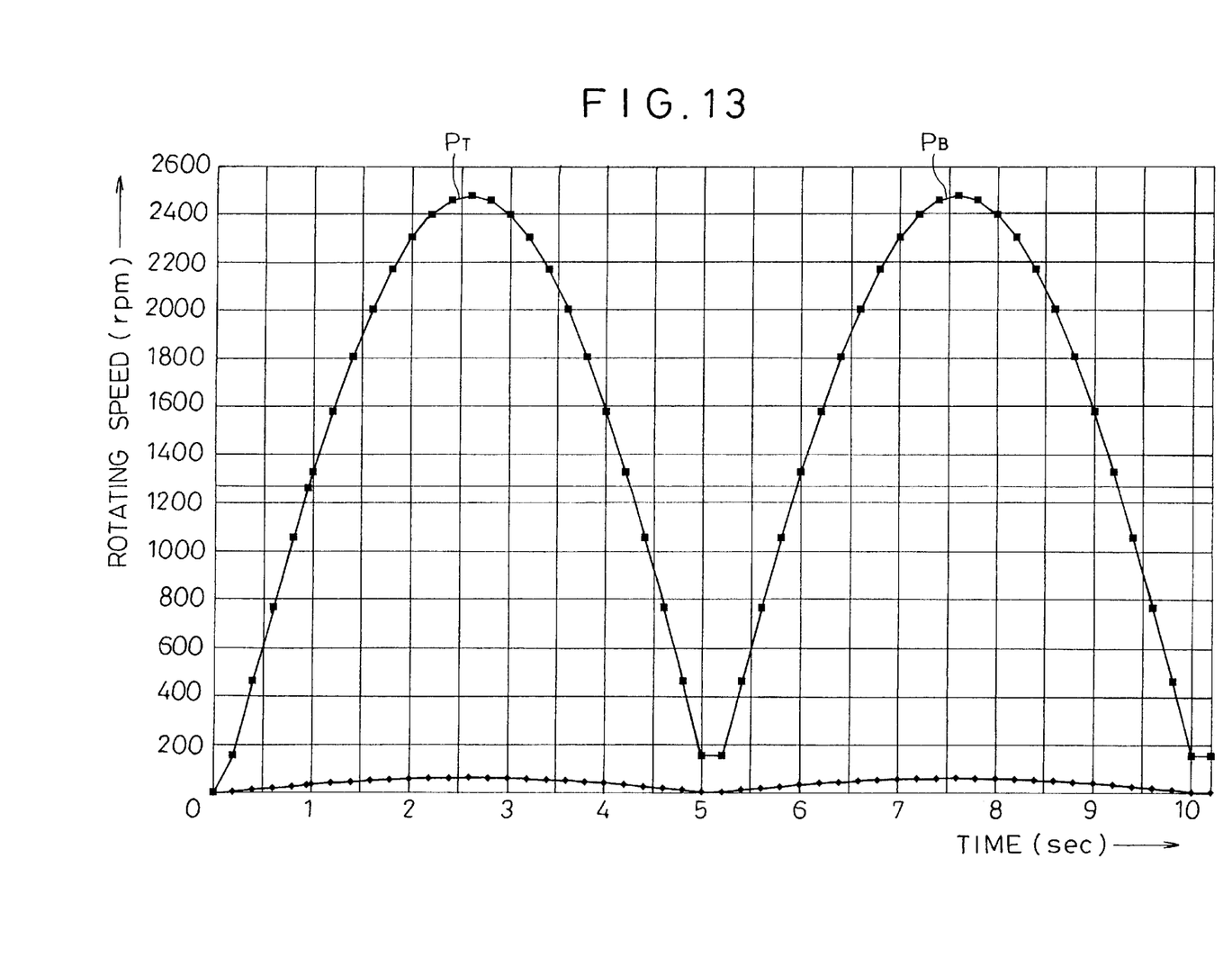
FIG. 13 is a graph showing time variation of rotating speed of a generator and that of a sprocket wheel.

1) Generator: a 5.5 KW, six-pole, 200 V, 60 Hz, three-phase induction motor
2) Speed-up gears: speed increasing ratio=40
3) Sprocket wheel: PCD (Pitch Circle Diameter)=193.65 mm
4) Dead-weight: weigh in the sea=4000 Kg
5) Shallow water waves: period=10 seconds, wave-height=2 m FIG. 13 is a graph showing time variation of rotating speed of the generator 11 and that of the sprocket wheel 5, where the abscissa represents the period of the wave, and the ordinate represents the rotating speed (rpm) of the generator and the sprocket wheel. The rotating speed varies describing a mountainous curve, and two peaks of the rotating speed are seen in FIG. 13. The peak $P_T$ corresponds to the time when the float 1 is lifted to the top of the wave, and the other peak $P_B$ corresponds to the time when the float 1 arrives at the bottom of the wave. If the float 1 is capable of utilizing the kinetic energy of the wave only when the wave is rising or only when the wave is falling in its up-and-down motion, only one peak of the rotating speed is produced in one period of the wave, so that the generating efficiency is low.

Supposing the reversible unit 12 were not attached to the present power generating installation, variation of the rotating speed describes such a curve that one of the two mountainous portions shown in FIG. 13 is formed under the abscissa (representing 0 rpm) symmetrically to the present portion shown in FIG. 13. Thus, the continuous rotary motion of the generator 11 and the speed-up gears 13 accompanying the up-and-down motion of the wave requires reversal once in each period of the wave. The moment of inertia acting on the generator 11 arranged at the output side of the speed-up gears 13 is 1600 times as large as that acting on the input side of the speed-up gears 13 (Here, the numerical value 1600 is derived from square of the speed increasing ratio 40.), which hinders the momentary reversal action of the generator 11.

In the present power generating installation, owing to the function of the reversible unit 12, the direction of rotation of the generator 11 is kept constant whether the wave is rising or falling in its up-and-down motion. Thus, two peaks of the rotating speed are produced in one period of the wave as shown in FIG. 13, so that the generating efficiency is increased.

The synchronous speed of the six-pole, 60 Hz generator 11 of is 1200 rpm. The generator 11 generates power when the rotating speed exceeds the synchronous speed. Supposing slip (electrical loss during the rotation) of 5% is produced, the rated power is obtained at a rotating speed of 1260 rpm. When the generator 11 is designed for the normal power of 5.5 KW, the generator 11 generates power of approximately 3.6 KW at a rotating speed of 1260 rpm, and power of approximately 21.4 KW at a rotating speed close to the maximal rotating speed of 2400 rpm. The total generated power corresponds to the area obtained by integrating the rotating speed exceeding the rotating speed of 1200 rpm in FIG. 13, which is approximately 14 KWh when roughly calculated.

The variation curve shown in FIG. 13 is such that the simple harmonic cosine curve of the wave is simply converted to the rotating speed of the generator. Actually, the portion of the curve descending from the first peak $P_T$ comes down only to 170~180 rpm due to the moment of inertia acting on rotors of the generator and gears. The falling of the curve as seen in the middle of FIG. 13 is actually eased to a certain degree, that is, not so steep as shown in FIG. 13. In order to increase the moment of inertia acting on those rotary elements and thereby to increase the total generated power, a flywheel may be connected directly with the shaft of the generator.

The present power generating installation is capable of generating power when the wave has a wave-height larger than 1 m.

The present embodiment shows the power generating installation smallest in scale. The present power generating installation can be made larger in scale to a certain extent, as long as the respective machine elements are so designed that the stress acting thereon may be lower than the allowable stress.

In the above described embodiment, the three phase induction generator is used as the generator 11. Other types of generators such as a synchronous generator can be also used as the generator 11.

What is claimed is:

1. A power generating installation for generating power utilizing a shallow water wave,comprising:
    a mooring member;
    a force transmitting member having one end connected with said mooring member and another end to which a dead weight is attached; and
    a float provided with (i) a generator and (ii) a rotary member for rotating engaged with said force transmitting member;
    wherein said rotary member produces a rotary force when said float moves up and down according to an up-and-down motion of the wave, and said rotary force is transmitted to said generator to thereby cause said generator to generate power;
    wherein said rotary member and said generator are connected through a reversible unit having an input shaft and an output shaft which are arranged so that the output shaft rotates constantly in a single direction regardless of a direction of rotation of the input shaft, thereby causing the generator to also rotate in a single direction both when the wave is rising and when the wave is falling throughout the up-and-down motion of the wave;
    wherein said reversible unit includes a gear mechanism for transmitting a rotary force of said generator to said rotary member; and
    wherein at a time of a marine anomaly, said generator is made to function as an electric motor and rotates said rotary member through said gear mechanism to thereby bring down said float below a sea surface.

2. A power generating installation according to claim 1, wherein said force transmitting member comprises a chain.

3. A power generating installation according to claim 2, wherein said rotary member comprises at least one sprocket wheel.

4. A power generating installation according to claim 1, wherein said rotary member comprises at least one sprocket wheel.

5. A power generating installation according to claim 1, wherein said shallow water area has a depth of approximately 25~80 m.

6. A power generating installation according to claim 1, wherein said power generating installation comprises a plurality of floats connected by connecting members in a manner such that each of said floats is capable of moving up and down.

* * * * *